United States Patent [19]
Terada et al.

[11] Patent Number: 5,728,018
[45] Date of Patent: Mar. 17, 1998

[54] METHOD AND APPARATUS FOR POSITIONING A BICYCLE DERAILLEUR CHAIN GUIDE

[75] Inventors: Masao Terada; Toshio Mizuno, both of Sakai, Japan

[73] Assignee: Shimano, Inc., Osaka, Japan

[21] Appl. No.: 559,910

[22] Filed: Nov. 17, 1995

[30] Foreign Application Priority Data

Nov. 25, 1994 [JP] Japan .................... 6-314290

[51] Int. Cl.$^6$ .................... F16H 59/00
[52] U.S. Cl. .................... 474/80; 474/127; 474/128
[58] Field of Search .................... 474/78, 80, 82, 474/122, 127, 128

[56] References Cited

U.S. PATENT DOCUMENTS

| | | | |
|---|---|---|---|
| 3,901,095 | 8/1975 | Wechsler | 74/217 |
| 4,194,409 | 3/1980 | Nagano | 474/80 |
| 4,198,873 | 4/1980 | Nagano et al. | 474/82 |
| 4,226,130 | 10/1980 | Isobe | 474/82 |
| 4,486,182 | 12/1984 | Coue | 474/80 |
| 5,496,222 | 3/1996 | Kojima et al. | 474/80 |

FOREIGN PATENT DOCUMENTS

| | | | |
|---|---|---|---|
| 0 067 729 A1 | 12/1982 | European Pat. Off. | B62M 9/12 |
| 3518220 | 11/1985 | Germany | 474/82 |

OTHER PUBLICATIONS

European Search Report for EP 95 30 7957, dated Oct. 3, 1996.

Primary Examiner—Roger J. Schoeppel
Attorney, Agent, or Firm—James A. Deland

[57] ABSTRACT

A bicycle derailer of the type wherein a movable derailer member moves relative to another member for positioning the chain guide relative to a first sprocket and a second sprocket. An indicating member is disposed on one of the movable derailer member or the other member, and indicium is disposed on the other one of the movable member or the other member. A relative position between the indicating member and the indicium indicates a position of the chain guide relative to the first sprocket and the second sprocket. Thus, the derailer may be adjusted to a desired position by moving the chain guide so that the indicating member is set to a desired position relative to the indicium.

13 Claims, 5 Drawing Sheets

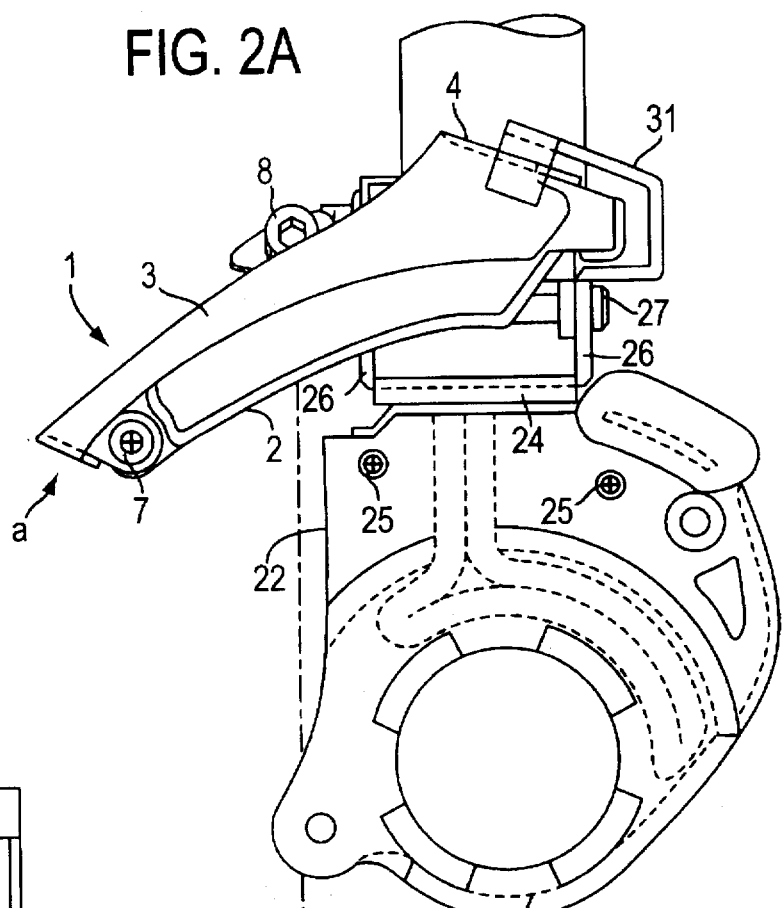
FIG. 2A
FIG. 2B
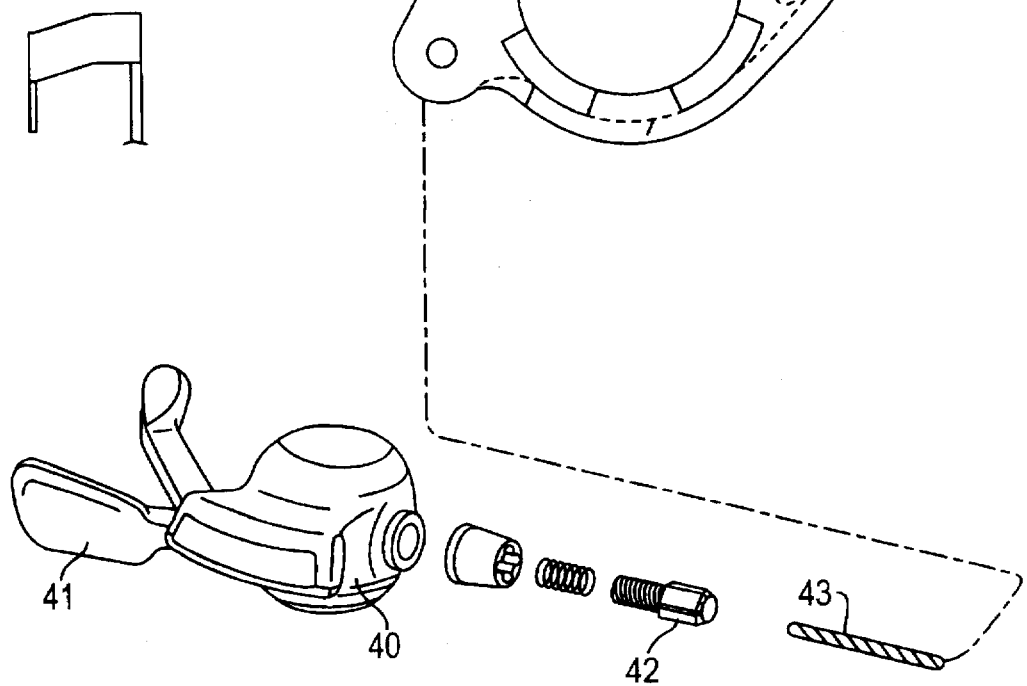

METHOD AND APPARATUS FOR POSITIONING A BICYCLE DERAILLEUR CHAIN GUIDE

BACKGROUND OF THE INVENTION

The present invention relates to a chain guide positioning mechanism for a bicycle shifter. More specifically, it relates to a chain guide positioning mechanism for a derailleur that is used to change the engagement position of a chain that engages with a front or rear sprocket.

A plurality of front chain wheels with different numbers of teeth are usually located at the front of a bicycle to allow a speed change. A chain is run from the front chain wheel to the rear sprocket consisting of a plurality of gears with different numbers of teeth, with a speed change being realized through the difference in engagement between the two. To change the engagement of the chain on the front chain wheel (for example) in order to make a speed change, the chain must be moved parallel and lined up with the position of the front chain wheel by a part called a front derailleur. If this parallel movement is not performed at the proper position, the engagement of the chain cannot be changed. The front derailleur is driven and positioned at the engagement change position according to the selected speed via a cable and by means of a shift lever mechanism attached to the handlebar.

In the case of a three-gear front chain wheel, assembly and adjustment are performed in the following sequence. First, the front derailleur is fixed to the frame position, and a cable is run between the front derailleur and the shift lever mechanism located on the handlebar. Thereafter, the shift lever of the shift lever mechanism is moved to the low position, and the chain guide of the front derailleur is positioned at the location of the low gear of the front chain wheel. The position of the chain guide is adjusted by turning the low stopper bolt on the front derailleur so that the low gear position is attained, and the adjustment bolt of the cable adjustment unit of the shift lever mechanism is turned so that the tension of the inner cable is adjusted to its optimal setting. The shift lever of the shift lever mechanism is then moved to the top position, and the chain guide is also driven to the top gear. Thereafter, the top stopper bolt of the front derailleur is adjusted so that the position of this chain guide is optimized.

Such derailleurs are designed so that the chain guide is supposed to be positioned at the location of the middle gear when the shift lever is moved to the middle position, but in actual practice the optimal position is not attained because of the relationship of the tension on the inner cable. Consequently, the adjuster of the cable adjustment unit must again be turned so that the chain guide will come to the location of the middle gear in order to adjust the tension on the inner cable. As a result, considerable time and skill is required for the assembly and adjustment of the chain guide positioning mechanism of a conventional bicycle derailleur.

SUMMARY OF THE INVENTION

The present invention is directed to a method and apparatus for positioning a bicycle derailleur chain guide which greatly simplifies assembly and adjustment of the derailleur mechanism. The specific position of the chain guide may be checked visually, and adjustment takes place in a manner which allows positioning of the chain guide to be performed quickly even by relatively unskilled workers.

In one embodiment of the present invention directed to a bicycle derailleur of the type wherein a movable derailleur member moves relative to another member for positioning the chain guide relative to a first sprocket and a second sprocket, an indicating member is disposed on one of the movable derailleur member or the other member, and indicium is disposed on the other one of the movable member or the other member. A relative position between the indicating member and the indicium indicates a position of the chain guide relative to the first sprocket and the second sprocket. Thus, the derailleur may be adjusted to a desired position by moving the chain guide so that the indicating member is set to a desired position relative to the indicium.

In a more specific embodiment, a mounting member is provided for mounting the derailleur to the bicycle frame, a first link is pivotally coupled to the mounting member, a second link is coupled to the first link and to the chain guide for moving the chain guide in response to pivoting of the first link, and the indicium is disposed on the second link. If desired, the indicating member may be a projecting member coupled to the mounting member.

In any event, the derailleur typically is coupled to a cable which, in turn, is coupled to a shift lever, and an adjustment unit is provided for adjusting the tension on the cable. The adjustment unit is used to vary the tension on the cable and thereby move the chain guide. Adjustment of the position of the chain guide relative to the sprockets may be performed by watching the relative positions of the indicating member and the indicium as the chain guide moves. Adjustment of cable tension is stopped when the indicating member reaches a predetermined position relative to the indicia, thus indicating the correct position of the chain guide relative to the sprockets.

BRIEF DESCRIPTION OF THE DRAWINGS

FIG. 2A is a side view of the derailleur shown in FIG. 1 showing a cable connection to a shift lever;

FIG. 2B is a view along arrow "a" in FIG. 2A;

DETAILED DESCRIPTION OF THE EMBODIMENTS

Figure 5:
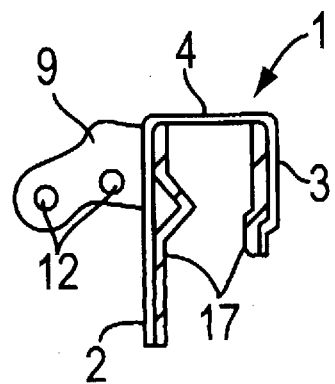
FIG. 5 is a view of the derailleur taken along line V—V in FIG. 3.
Figure 6:
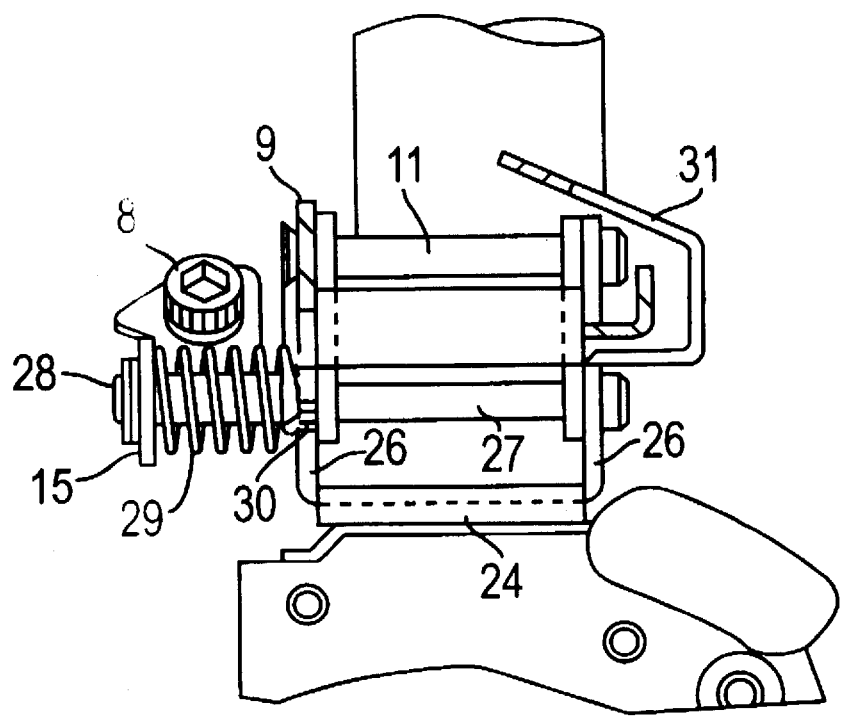
FIG. 6 is a view taken along line VI—VI in FIG. 3.

As shown in the figures, a chain guide 1 has a groove with a U-shaped cross section, as shown in FIG. 5, and is used to guide the chain by bringing it into contact with this groove surface during a shift. A lining 17 made of a synthetic resin with good lubricity is applied by a known method to the groove surface so that the chain will slide smoothly. The chain guide 1 chiefly comprises two guide plates 2 and 3. The upper portions of these guide plates 2 and 3 are integrally linked by an upper linking component 4. This upper portion has an opening 5 formed in it. The chain (not shown) goes through this opening 5, so that the chain is guided smoothly during a shift.

Figure 1:
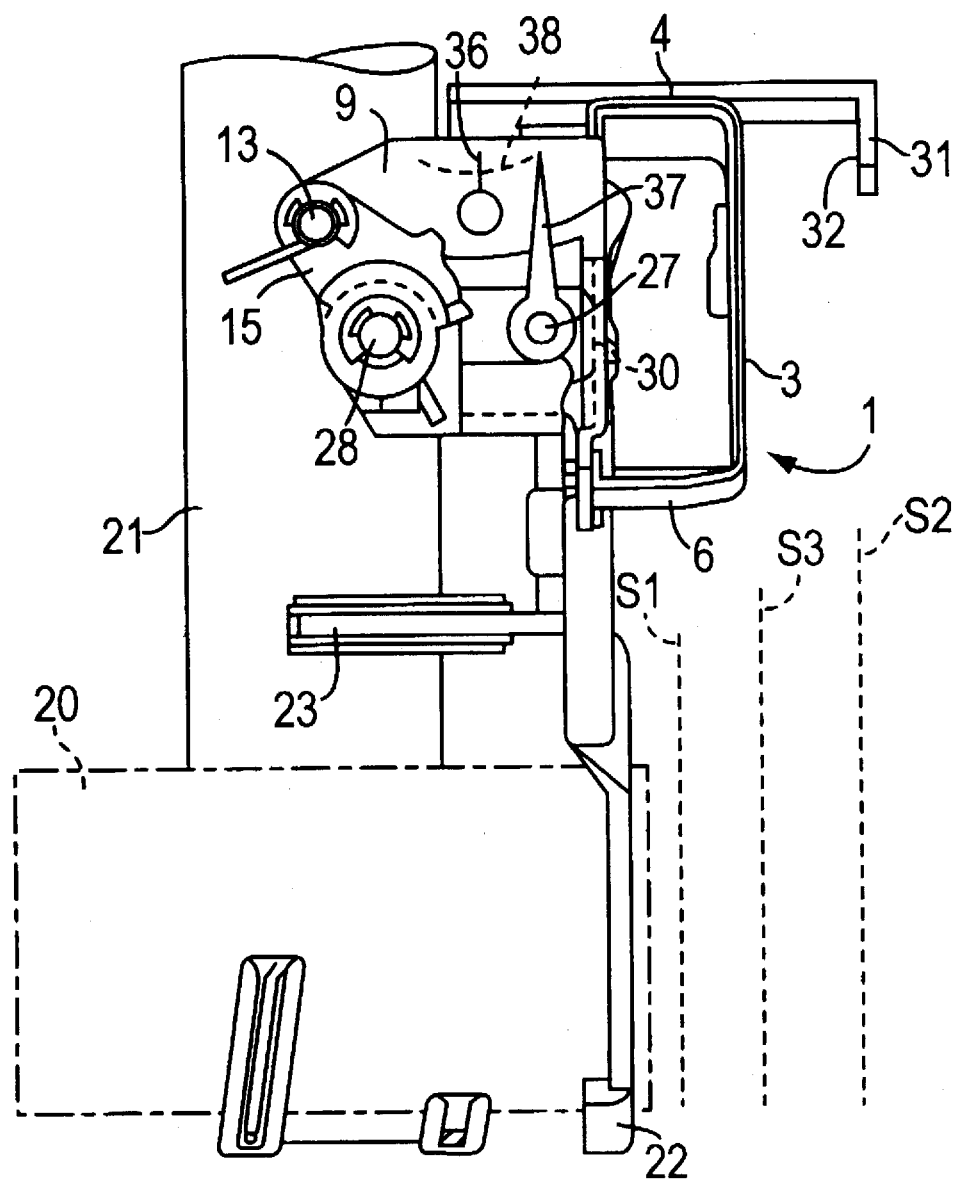
FIG. 1 is a rear view of a particular embodiment of a front derailleur which incorporates a positioning apparatus according to the present invention.
Figure 3:
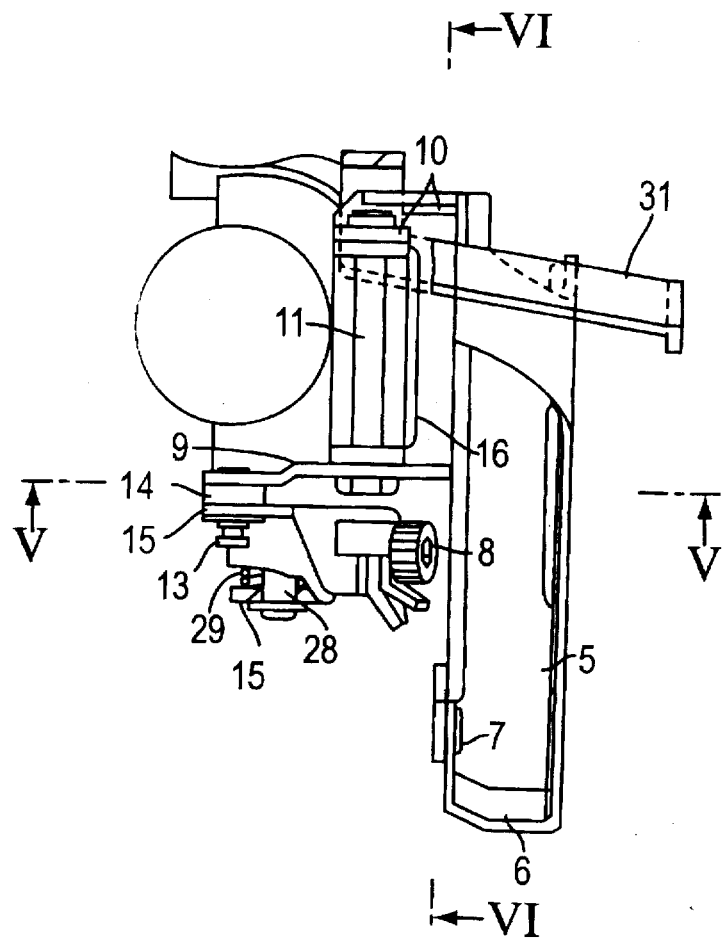
FIG. 3 is a top view of the derailleur shown in FIG. 1.

At the lower end of the chain guide 1, the guide plate 3 is bent into an L shape to form a lower linking component 6. This end is fixed to the guide plate 2 by a screw 7. The chain guide 1 is made of steel, the surface of which is plated with chrome so as to improve wear resistance. A second link in the form of a movable link 9 and a link pin attachment component 10 are integrally arranged and fixed in parallel to the fore and aft positions of the chain guide 1 (see FIGS. 3 and 5).

Figure 4:
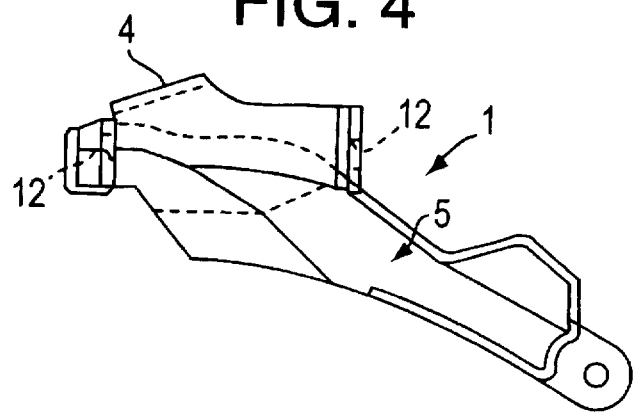
FIG. 4 is a side view of the chain guide used with the derailleur shown in FIG. 1.

The movable link 9 corresponds to the movable link that makes up part of the four-joint linking mechanism. The movable link 9 and the link pin attachment component 10 have three link pin support holes 12 made in them (see FIGS. 4 and 5), and are rotatably supported. Specifically, them are two holes in the movable link 9 and one in the link pin attachment component 10. A movable link pin 13 is rotatably inserted into the link pin support hole 12 at one end of the movable link 9. A first link in the form of an L link 15 is further rotatably provided to the movable link 9 via a bushing 14. The movable link 9, the bushing 14, and the L link 15 are rotatably linked and supported by the link pin 13, and this linked and supported portion makes up one joint of the four-joint linking mechanism. A movable link pin 11 is inserted into the link pin support hole 12 and runs between the link pin attachment component 10 and the movable link 9. The upper portion of a movable vertical link 16 is rotatably supported by this movable link pin 11.

A mounting member in the form of a fixing flange 22 and a semicircular clamp ring 23 are fixed and supported by a horizontally arranged bottom bracket 20 that is part of the bicycle frame, and by a vertical frame that is integrally welded to this bottom bracket. The fixing flange 22 and the semicircular clamp ring 23 are used to fix a fixing link (member) 24 that is part of the four-joint linking mechanism to the bicycle frame. The semicircular clamp ring 23 is in contact with and encircles approximately one-half of the periphery of the vertical frame 21, and is fixed to the fixing flange 22. The fixing link 24 is fixed to the fixing flange 22 by a bolt 25. The fixing flange 22 is fixed to the bottom bracket 20 by a nut, which means that the fixing link 24 is fixed to the fixing flange 22. Parallel fixing flanges 26 are integrally formed at the upper portion of the fixing link 24.

A fixing link pin 27 runs between the fixing flanges 26. The lower end of the movable vertical link 16 is rotatably supported by the fixing link pin 27. Furthermore, one end of a fixing link 28 is fixed to one of the fixing flanges 26. One end of the L link 15 is rotatably supported by the fixing link 28. The other end of the L link 15 is rotatably supported by the movable link pin 13. A coil spring 29 is arranged around the outside of the fixing link 28, and the coil spring 29 constantly energizes the L link 15 in one direction, i.e., it energizes the chain guide 1 to the low side. As a result, the movable link pin 13, the L link 15, the movable link 9, the movable link pin 11, the movable vertical link 16, the fixing flanges 26, the fixing link pin 27, the fixing link 24, and the fixing link 28 make up a parallel four-joint linking mechanism. The L link 15 drives the parallel four-joint linking mechanism, moves the chain guide 1 parallel during a shift, and drives the chain.

A cable fixing bolt unit 8 is arranged at one end of the L link 15. The cable fixing bolt unit 8 is used to fix one end of a cable 43 that is operated by the shift lever 41 in order to make a shift with the shift lever 41 of the shift lever mechanism 40 fixed to the handlebar. The tension on the cable 43 is adjusted by a cable adjustment unit in the form of an adjustment bolt 42. The chain guide 1 is energized to the fixing link 24 side by the coil spring 29 of the fixing link 28. This position is the position at which the cable 43 is not pulled by the shift lever 41, and is the position at which the chain is guided by the chain guide to the position of the smallest diameter sprocket S1 of the triple front chain wheel. This position is the low position in a shift operation, and this low position is determined when the side face of the guide plate 2 of the chain guide 1 hits a first positioning member in the form of a low stopper 30 provided to the side end of the fixing flanges 26. The top position of the chain guide 1 is defined by a second positioning member in the form of a top stopper 31 that integrally extends to the fixing link 24. The top stopper 31 hits the outer side face of the guide plate 3 of the chain guide 1 with its stopper surface 32, and guides and restricts the chain to the position of the largest diameter sprocket S2 of the triple front chain wheel.

Indicium in the form of a graduated display 36 and a locus display 38 is scribed into the movable link 9. The graduated display 36 is used when the chain is guided by the chain guide 1 to the middle position, i.e., to the position of the middle diameter sprocket S3 of the triple from chain wheel. Meanwhile, the lower end of an indicating member in the form of an indicator needle 37 (made from a sheeting material) is fixed to the fixing link pin 27, so the indicator needle 37 does not move. The locus display 38 made fore and aft of the graduated display 36 indicates the locus of the tip of the indicator needle 37. The system is designed such that the chain guide 1 will be in the middle position when the indicator needle 37 and the graduated display 36 line up.

Figure 7:
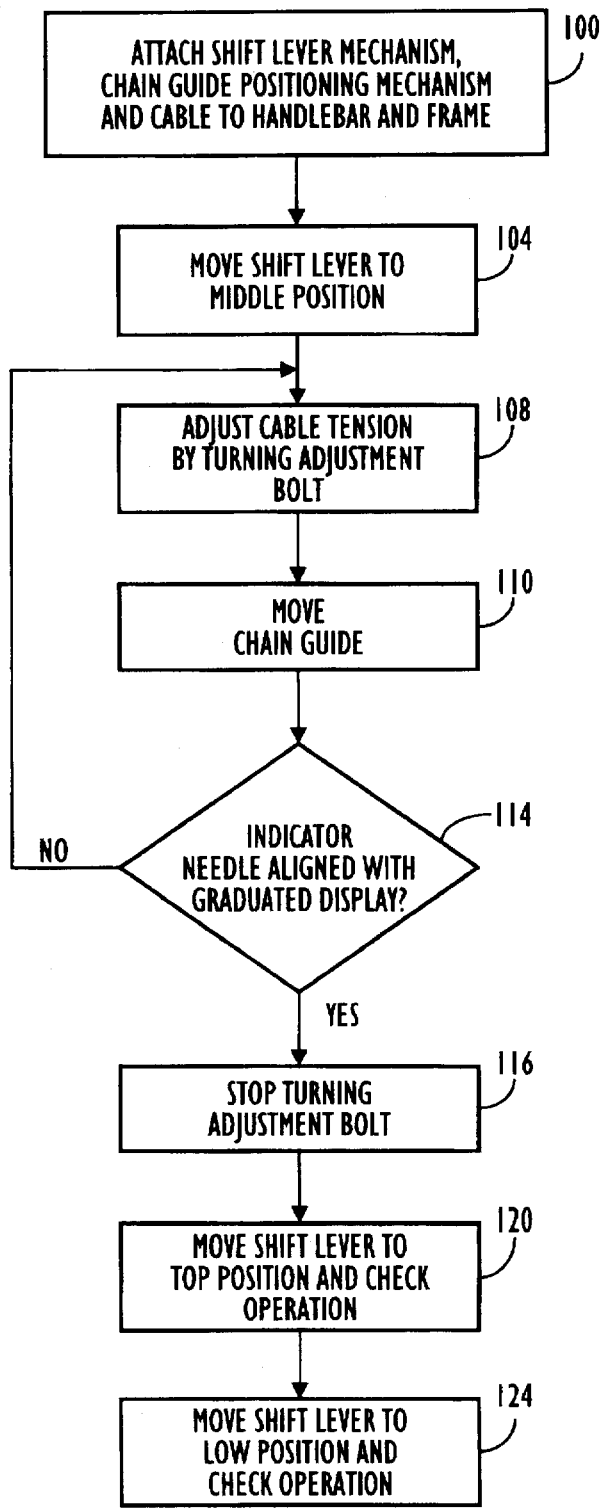
FIG. 7 is a flow chart illustrating a particular embodiment of a method according to the present invention for adjusting a chain guide.

The method for adjusting the above-mentioned chain guide positioning mechanism will now be described with reference to FIG. 7. First, the shift lever mechanism 40, the chain guide positioning mechanism, the cable 43, and various other parts are attached to the handlebar and the frame by specified methods in a step 100. The procedure for these attachments is the same as in the past. The following adjustment procedure is then undertaken.

(1) The shift lever 41 on the handlebar is moved to the middle position in a step 104.

(2) The adjustment bolt 42 of the cable adjustment unit of the shift lever 41 is turned to adjust the cable 43 to the proper tension and line up the indicator needle 37 with the graduated display 36 in steps 108 through 116.

(3) The shift lever 41 is moved to the top position and the low position in steps 120 and 124, the operation is checked, and the adjustment is complete.

Once the middle position has been adjusted properly, since the middle position is located halfway between the top and low positions, the top and low positions are determined by design. Also, since the low and top positions of the chain guide 1 are defined by the low stopper 30 and the top stopper 31, the chain guide 1 is positioned properly.

While the above is a description of various embodiments of the present invention, further modifications may be employed without departing from the spirit and scope of the present invention. For example, the above practical example dealt with a three-speed type of front chain wheel, but the present invention may also be applied to a two-gear type with only top and low gears. Also, the above practical example involved a top stopper 31 in the form of an arm that extended in an L shape, but the stroke may also be adjusted by arranging the adjustment bolt over the movable link 9 as in the past. A low stopper 30 was described but the portion where the fixing link 24 hits the side face of the guide plate 2, which is mechanically determined even without the provision of the low stopper 30, may instead serve as the low stopper.

Of course, the teachings of the present invention also could be applied to a rear derailleur. Thus, the scope of the invention should not be limited by the specific structures disclosed. Instead, the true scope of the invention should be determined by the following claims. Furthermore, although labelling symbols are used in the claims in order to facilitate reference to the figures, the present invention is not intended to be limited to the constructions in the appended figures by such labelling.

What is claimed is:

1. A front derailleur for a bicycle for guiding a chain relative to a first sprocket, a second sprocket and a third sprocket disposed between the first sprocket and the second sprocket comprising:

a mounting member (22) for fixedly mounting the derailleur to a bicycle frame (21);
   a chain guide (1) for guiding the chain relative to the first sprocket, the second sprocket and the third sprocket;
   a first link (15) pivotally coupled to the mounting member (22);
   a second link (9) coupled to the first link (15) and to the chain guide (1) for moving the chain guide (1) in response to pivoting of the first link (15);
   a fixed member (24,26,27) coupled to the mounting member (22) and fixed relative to the mounting member (22);
   an indicating member (37) disposed on one of the second link (9) and the fixed member (24,26,27); and
   indicium (36,38) disposed on the other one of the second link (9) and the fixed member (24,26,27);
   wherein an aligned position between the indicating member (37) and the indicium (36,38) indicates an aligned position of the chain guide (1) relative to the third sprocket.

2. The front derailleur according to claim 1 wherein the indicating member (37) comprises a projecting member coupled to the fixed member, and wherein the indicium (36,38) comprises a marking disposed on the second link (9).

3. The front derailleur according to claim 1 wherein the derailleur comprises:

a first positioning member (30) for positioning the chain guide (1) at the first sprocket; and
   a second positioning member (31) for positioning the chain guide at the second sprocket.

4. The front derailleur according to claim 1 further comprising:

a shift lever (41) for mounting to the bicycle;
   a cable (43) connected between the shift lever (41) and the first link (15); and
   a cable adjustment unit (42) used to adjust the tension on the cable (43).

5. A front derailleur for a bicycle for guiding a chain relative to a first sprocket, a second sprocket and a third sprocket disposed between the first sprocket and the second sprocket comprising:

a mounting member (22) for fixedly mounting the derailleur to a bicycle frame (21);
   a chain guide (1) for guiding the chain relative to the first sprocket, the second sprocket and the third sprocket;
   a first link (15) pivotally coupled to the mounting member (22);
   a second link (9) coupled to the first link (15) and to the chain guide (1) for moving the chain guide (1) in response to pivoting of the first link (15);
   a fixed member (24,26,27) coupled to the mounting member (22) and fixed relative to the mounting member (22);
   an indicating member (37) disposed on one of the second link (9) and the fixed member (24,26,27);
   indicium (36,38) disposed on the other one of the second link (9) and the fixed member (24,26,27);
   wherein an aligned position between the indicating member (37) and the indicium (36,38) indicates an aligned position of the chain guide (1) relative to the third sprocket;
   a first positioning member (30) for positioning the chain guide (1) at the first sprocket;
   a second positioning member (31) for positioning the chain guide at the second sprocket;
   wherein the chain guide (1) comprises:
      an inner guide plate (2) coupled to the second link (9);
      an outer guide plate (3) coupled to the inner guide plate (2) for defining an opening (5) through which a drive chain may pass;
   wherein the first positioning member (30) is coupled to the mounting member (22) for limiting inward lateral movement of the chain guide (1); and
   wherein the second positioning member (31) is coupled to the mounting member (22) for limiting outward lateral movement of the chain guide (1).

6. The front derailleur according to claim 5 wherein the first positioning member (30) is disposed for abutting against the chain guide (1) when the chain guide (1) is positioned at the first sprocket, and wherein the second positioning member (31) is disposed for abutting against the chain guide (1) when the chain guide (1) is positioned at the second sprocket.

7. The front derailleur according to claim 5 wherein the first positioning member (30) is disposed for abutting against a laterally inner side surface of the inner guide plate (2) when the chain guide (1) is positioned at the first sprocket, and wherein the second positioning member (31) is disposed for abutting against a laterally outer side surface of the outer guide plate (3) when the chain guide (1) is positioned at the second sprocket.

8. A method of adjusting a chain guide (1) for a bicycle derailleur, the derailleur being of the type including a mounting member (22) for fixedly mounting the derailleur to a bicycle frame (21 ); a first link (15) pivotally coupled to the mounting member (22); a second link (9) coupled to the first link (15) and to the chain guide (1) for moving the chain guide (1) in response to pivoting of the first link (15); a fixed member (24,26,27) coupled to the mounting member (22) and fixed relative to the mounting member (22); an indicating member (37) disposed on one of the second link (9) and the fixed member (24,26,27); indicium (36,38) disposed on the other one of the second link (9) and the fixed member (24,26,27); wherein an aligned position between the indicating member (37) and the indicium (36,38) indicates an aligned position of the chain guide (1) relative to a third sprocket disposed between a first sprocket and a second sprocket, and wherein a shift lever (41) is mounted on a bicycle, a cable (43) is mounted between the shift lever (41) and the derailleur for causing the chain guide (1) to move in response to movement of the shift lever (41), and an adjustment unit (42) is provided for adjusting the tension on the cable (43), the method comprising the steps of:

positioning the chain guide (1) at the aligned position relative to the third sprocket, the positioning step including:
      adjusting the tension on the cable (43) to cause the chain guide (1) to move; and
      stop adjusting the tension on the cable (43) when the indicating member (37) aligns with the indicium (36,38).

9. The method according to claim 8 wherein the shift lever (41) is capable of movement between a first position and a second position, and wherein the method further comprises the step of:

moving the shift lever (41) to a position intermediate the first position and the second position before adjusting the tension on the cable (43).

10. A bicycle derailleur comprising:

a mounting member (22) for mounting the derailleur to the bicycle frame (21);

a non-moving fixed member (24,26,27) coupled to the mounting member and fixed relative to the bicycle frame;

a first link (15) pivotally coupled to the mounting member (22);

a second link (9) coupled to the first link (15)

a chain guide (1) including:
an inner guide plate (2) coupled to the second link (9); and
an outer guide plate (3) coupled to the inner guide plate (2) for defining an opening (5) through which a drive chain may pass;

wherein the second link (9) is coupled to the chain guide (1) for moving the chain guide (1) laterally relative to the bicycle frame (21) in response to pivoting of the first link (15);

a first positioning member (30) coupled to the mounting member (22) for limiting inward lateral movement of the chain guide (1);

a second positioning member (31) coupled to the mounting member (22) for limiting outward lateral movement of the chain guide (1);

an indicating member (37) disposed on one of the second link (9) and the fixed member (24,26,27);

indicium (36,38) disposed on the other one of the second link (9) and the fixed member (24,26,27); and wherein a relative position between the indicating member (37) and the indicium (36,38) indicates a position of the chain guide (1) relative to the first sprocket and the second sprocket.

11. The apparatus according to claim 10 wherein the first positioning member (30) is disposed for abutting against the chain guide (1) when the chain guide (1) is positioned at the first sprocket, and wherein the second positioning member (31) is disposed for abutting against the chain guide (1) when the chain guide (1) is positioned at the second sprocket.

12. The apparatus according to claim 10 wherein the first positioning member (30) is disposed for abutting against a laterally inner side surface of the inner guide plate (2) when the chain guide (1) is positioned at the first sprocket, and wherein the second positioning member (31) is disposed for abutting against a laterally outer side surface of the outer guide plate (3) when the chain guide (1) is positioned at the second sprocket.

13. The apparatus according to claim 10 further comprising:

a shift lever (41) for mounting to the bicycle;

a cable (43) connected between the shift lever (41) and the first link (15); and a cable adjustment unit (42) used to adjust the tension on the cable (43).

* * * * *